Patented Apr. 19, 1938

2,114,307

UNITED STATES PATENT OFFICE 2,114,307

SPREADER FOR SPRAYS

John F. Littooy, San Francisco, Calif.

No Drawing. Application July 12, 1933, Serial No. 680,154

7 Claims. (Cl. 167—42)

My invention relates to a spreader for liquid sprays containing insecticides and similar toxic substances, one object of my invention being to provide a spreader which will effect a heavier and improved coverage and better adherence of the spray on the surface sprayed.

Another object is the provision of a spreader which is chemically neutral and inert, and which is suitable for general application with insecticides, fungicides and similar agents such as commonly used in liquid spray mixtures, without impairing the toxic effect thereof.

Another object is the provision of a spreader having comparatively small bulk whereby packaging and shipping costs are minimized, and which may be manufactured and used economically.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

In the spraying of liquid spray compositions containing insecticides, fungicides, and similar agents for the protection of vegetation from destructive organisms, it has been common practice to add to the spray mixture an agent (called a spreader) for reducing the surface tension so as to increase the area over which the spray will spread when deposited upon a surface. For this purpose, a mixture of casein, lime and/or deflocculating agents has been commonly used. The products are dissolved in the spray mixture and tend to reduce the surface tension. The use of lime or other similar alkaline reagent has been objectionable as it has necessarily resulted in producing a spreader of strongly alkaline character. Moreover, the lime, or lime and soda ash reacts with certain of the commonly used insecticides and fungicides, and materially reduces the toxic properties thereof.

Thus, while the mixture of casein with lime—or lime and soda ash is more or less effective for increasing the spreading properties of the spray composition, the reaction of the lime or lime and soda ash with the toxic agent lessens the toxicity of certain spray compounds. As a result, a correspondingly heavier deposit of the spray material has been necessary, and the cost of spraying has been increased, both by the additional amount of toxic agents and spraying required, and by the loss resulting from the run off incident to the heavier spraying.

To overcome the objectionable alkaline feature of the lime—or lime and soda ash—casein spreaders heretofore in general use, I have produced an improved spreader of a chemically neutral and inert character suitable for use with any of the common toxic agents without impairing the toxicity thereof, and which I have found to be especially efficacious and economical in use.

The spreader of my invention preferably comprises a mixture of casein, powdered skimmed milk, and barium sulphate. These ingredients are preferably mixed in the proportion of one part casein to one part powdered skimmed milk and two parts barium sulphate. The relative amounts of the several ingredients may be varied within reasonable limits without seriously impairing the effectiveness of the mixture.

The powdered skimmed milk dissolves in the spray mixtures and serves to reduce the surface tension of the spray mixture without impairing the toxicity of the toxic agents as in the case of lime or lime and soda ash such as heretofore commonly used. The casein, by its adhesive property, serves to bind the toxic agent upon the surface sprayed. The barium sulphate lessens the bulk and in conjunction with the casein and powdered skimmed milk produces an effective spreader of a chemically neutral and inert character. A suitable deflocculator may be added to aid in the suspension of the toxic agent in the spray mixture.

Powdered skimmed milk used alone with the barium sulphate will reduce the surface tension, but such use is not entirely satisfactory as the skimmed milk must be used in comparatively large quantities to effect the desired reduction in surface tension in the spray mixture. Moreover, the powdered skimmed milk, being water-soluble, is not weather or rain resistant; and lacks the property of lasting adherence required and supplied by the casein, and which is necessary to bind the toxic agents to the surface sprayed. Because soluble, the powdered skimmed milk when used alone tends to cause an excessive run off of the spray mixture, thus causing valuable spray materials to go to waste, instead of contributing to a better spray coverage.

Barium sulphate is preferred as a filler because it is chemically neutral and inert with respect to the ordinary toxic agents, and hence does not impair the toxicity thereof. The total bulk of the spreader mixture is comparatively small; and the cost of containers and the cost of shipping is thereby minimized.

A small percentage of a deflocculator, such as gum arabic, gum ghatti, or dextrin may be added to the spreader mixture either by mixing it with the dry ingredients of the spreader, or by addition to the liquid spray mixture. The deflocculator aids in obtaining a smoother mix and maintaining a more uniform suspension throughout the bulk of the liquid spray mixture.

Because of its chemically neutral and inert character, my improved spreader may be used effectively with any insecticide or fungicide, or combination of spray materials whether acid or alkaline. Thus, the spreader being chemically compatible in acid or alkaline solutions does not react with or lessen the toxicity of arsenicals, fluosilicates, Bordeaux mixture, lime-sulphur, nicotine, or other toxic agents such as commonly used in liquid sprays.

The quantity of the spreader may be varied in accordance with the nature of the toxic spray required and the purpose for which it is to be used. For ordinary purposes, I have found in orchard experiment that from ¼ to ½ pound of the spreader to one hundred gallons of spray mixture gives a satisfactory result, depending upon the properties of the toxic spray used and the character of the surface upon which the mixture is sprayed. This amount is substantially half the amount of lime-casein spreader commonly used.

The several ingredients are preferably combined in dry powdered form to obtain a unified mixture which may be added to the toxic spray solution when it is ready for use. However, my invention contemplates that the relative amounts of each ingredient may be added separately to the spray solution if desired.

I claim:

1. A spreader for aqueous toxic sprays comprising a mixture of casein, powdered skimmed milk and barium sulphate.

2. A spreader for aqueous toxic sprays comprising a mixture of substantially equal parts of casein and powdered skimmed milk to which is added barium sulphate in an amount approximately equal to the combined casein and powdered skimmed milk.

3. A spray mixture comprising water and toxic material, and a spreader comprising casein, powdered skimmed milk and barium sulphate, the spreader being mixed with the spray in the proportion of approximately ¼ to ½ pound to 100 gallons of spray.

4. A spray mixture comprising water and toxic material, and a spreader comprising substantially one part each of casein and powdered skimmed milk and two parts of barium sulphate, the spreader being mixed with the spray in the proportion of approximately ¼ to ½ pound to 100 gallons of spray.

5. A spreader for aqueous sprays consisting essentially of casein, powdered skimmed milk, and barium sulphate.

6. A spreader for aqueous sprays consisting essentially of approximately one part casein, one part powdered skimmed milk, and two parts of barium sulphate.

7. A spreader for aqueous sprays comprising a mixture of casein, powdered skimmed milk, and barium sulphate, the mixture being substantially free of lime and the reaction products of lime and casein.

JOHN F. LITTOOY.